July 16, 1940.   A. E. SIMPSON   2,208,435

PRODUCTION OF MAPS FROM AERIAL PHOTOGRAPHS

Filed April 26, 1939   2 Sheets-Sheet 1

INVENTOR
A. E. SIMPSON
BY J. D. O'Connell
ATTORNEY

July 16, 1940.  A. E. SIMPSON  2,208,435
PRODUCTION OF MAPS FROM AERIAL PHOTOGRAPHS
Filed April 26, 1939   2 Sheets-Sheet 2

INVENTOR
A.E. SIMPSON
BY J.D. O'Connell
ATTORNEY

Patented July 16, 1940

2,208,435

UNITED STATES PATENT OFFICE 2,208,435

PRODUCTION OF MAPS FROM AERIAL PHOTOGRAPHS

Albert E. Simpson, Montreal, Quebec, Canada

Application April 26, 1939, Serial No. 270,257

6 Claims. (Cl. 33—189)

This invention relates to the production of maps from aerial photographs by the method known as radial line plotting. The principal object is to facilitate the rapid and accurate location of the basic reference or control points which must be marked on each photograph for plotting purposes.

In making a 'radial line" plot of a strip of overlapping photographs taken in the conventional manner the exact point of detail on which the principal center of each photograph falls must be located on the two adjacent photographs and pin-pricked or otherwise accurately marked. This establishes the control points through which are drawn the so-called "base lines" of the plot. It may be noted here that aerial photographs are usually taken so that the overlap of successive photographs along any one strip is actually more than 50% with the result that any three successive photographs have a small common area within which additional "side" control points are marked near the top and bottom of each photograph so that each of said additional points falls on exactly the same point of detail in each of the three photographs. With an overlap of more than 50%, it also follows that any one photograph contains the point of detail on which the principal centers of the preceding and succeeding photographs fall.

It frequently happens that the principal center of one photograph falls on some inconspicuous point which is difficult to locate and accurately mark on the two adjacent photographs. This occurs, for example, when the principal center of one photograph falls in the middle of a stream or on some inconspicuous point in an open field. Similarly, in selecting "side" control points within the area common to three successive photographs it is frequently difficult to fix upon a sharp well defined point that is sufficiently clear in each photograph.

According to the present invention the prevailing tedious and difficult method of selecting the requisite control points by means of the naked eye is superseded by the use of manually operable point locating and marking means which, in conjunction with a stereoscope, makes the selection and accurate marking of these points a relatively simple and rapid procedure.

In practicing the invention two overlapping photographs are suitably arranged on a table or other support on which they are manipulated by hand to give stereoscopic relief when viewed through a stereoscope. A point locating device comprising a floating mark mounted on a suitable carrier is then placed on one photograph and moved by hand until the floating mark is centered on the previously marked principal center of the photograph. A combined point locating and marking device previously placed on the second photograph is then manipulated by hand to locate and mark on the second photograph the exact point of detail on which the principal center of the first photograph falls. The last mentioned combination device comprises a floating mark and a marking element movably connected to a common carrier so that they may be used successively for locating and marking exactly the same point of detail. This combination device is first used with the floating mark disposed in an operative position and with the marking element disposed in an inoperative position. With the component parts in this position the carrier of the combination device is moved by hand over the second photograph until the floating mark appears to be grounded. When this condition is obtained the floating mark of the combination device will be centered on exactly the same point of detail as that on which the principal center of the first photograph falls. Then, while the carrier of the combination device is maintained in the point locating position to which it has been moved, the floating mark of such device is shifted to an inoperative out-of-the-way position so that the marking element may be then moved to an operative position in which it serves to mark on the underlying photograph the exact point of detail on which the floating mark of the combination device was previously centered. After the principal center of the first photograph has been thus accurately located and marked on the second photograph, the two carriers are transposed so that the floating mark previously centered on the principal center of the first photograph is now centered over the marked principal center of the second photograph. The carrier of the combination device is now moved over the first photograph until its floating mark is centered and grounded on the exact point of detail on which the principal center of the second photograph falls. The latter point is then accurately pin-pricked or otherwise marked with the aid of the previously mentioned marking element especially constructed to facilitate such marking. The next step is the initial selection and marking of "side" control points near the top and bottom of one photograph within the small area that is common to three successive photographs. In making this selection in accordance with the present invention it is not necessary to follow the old practice of searching with the eye for points of detail that are sharp and clear in all three photographs. On the contrary, points located near the top and bottom of one of the photographs under view may be pin-pricked or otherwise marked more or less at random so long as these points fall within the aforesaid common area of the photographs. Assuming, then, that these additional "side" control points have been selected and marked on the first photograph the exact location and marking of the corresponding points on the second photograph is quickly and easily accomplished in the following manner. The floating mark of the first mentioned locating device is accurately centered on one of said "side" points. The floating mark of the combination point locating and marking device is then moved over the second photograph until it appears to be grounded as viewed through the stereoscope. When this occurs the center of the second floating mark will coincide with the exact point of detail on which the first floating mark is centered. This point of detail is then marked on the second photograph by means of the previously mentioned marking element and the same procedure is repeated to locate, on the second photograph, the exact point of detail with which the remaining "side" control point marked on the first photograph coincides.

Following the above procedure the second photograph may be replaced by the third photograph which has a small area in common with said first and second photographs. The principal center and other control points marked on the first photograph are then located and marked on the third photograph by a repetition of the previously described procedure.

It is thought that the foregoing exposition is sufficiently comprehensive to enable a skilled artisan to clearly grasp the manner in which the invention may be used for locating and marking, on successive photographs, all the reference or control points required in carrying out a radial line plot. It may, however, be noted that the reference point locating and marking operations need not be carried out in exact accordance with the sequence set forth in the preceding description. The only essential requirement is that one floating mark be held centered on a previously selected point on one photograph while the other floating mark is being shifted about to find the corresponding point on the companion photograph.

In the further description of this invention reference will be had to the accompanying drawings, in which Figure 1 is a plan view of one of the floating marks provided in accordance with my invention.

Figure 5 is a perspective view illustrating the manner in which the two floating marks are used in conjunction with a stereoscope to find and mark the exact location on one photograph of a control point previously marked on a companion photograph within an area common to both.

Figure 1:
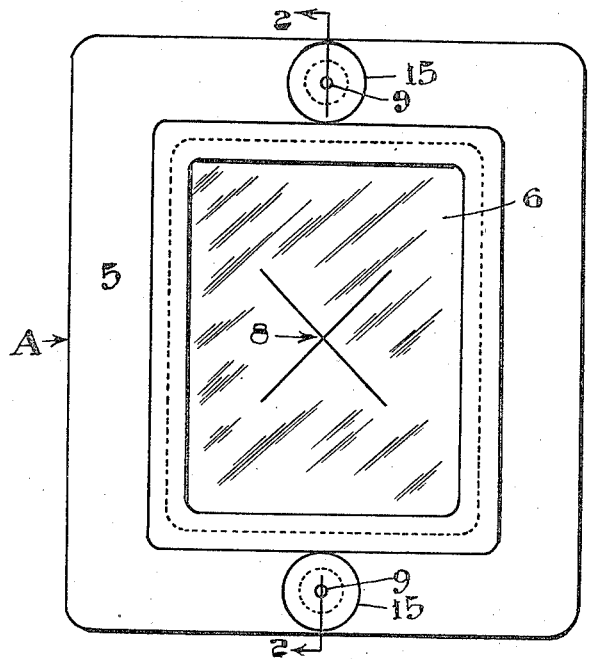

The floating mark carrier A (Figs. 1 and 2) comprises a simple rectangular frame 5 having its central opening closed by a transparent sheet 6 which may be made of glass, Celluloid, or other suitable material. The marginal portions of sheet 6 are secured in the frame recess 7 so that the bottom surface of the sheet is flush with the bottom surface of the frame. Sheet 6 is provided with a floating mark 8 which may be of any suitable form. By way of example, the floating mark 8 is herein shown as comprising a fine cross etched on the central portion of the lower surface of sheet 6.

The end members of frame 5 are equipped with movable anchoring pins 9 adapted to be pressed against an underlying photograph to hold the frame against accidental displacement when an observation is being made. As here shown each pin 9 is secured in the central bore of a holder 10 which slides in an opening 11 formed in one end of frame 5, the permissible sliding movement of said holder being limited by the key 12 and keyway 13. A spring 14 is confined between frame 5 and the enlarged head 15 of holder 10 and normally serves to hold the point of pin 9 in the elevated position shown in Fig. 2.

The floating mark carrier B (Figs. 3 and 4) comprises a rectangular frame 16 equipped with hingedly mounted interchangeable point locating and marking elements generally indicated at 17 and 18. The point locating element 17 comprises a glass or other transparent sheet 19 provided with a floating mark comprising a fine cross 20 etched on its lower surface. One end of sheet 19 is fastened by screws 21 to a plate 22 projecting laterally from a pivot shaft 23. The ends of shaft 23 are provided with conical recesses 24 in which are fitted the inner conical ends 25a of suitable pivot screws 25, said screws being threaded through openings formed in the side members of frame 16 and being secured in adjusted position by set screws 26. Plate 22 is provided with a knob or handle 27 so that sheet 19 may be conveniently swung to a raised position.

The marking element 18 comprises a pin carrying plate 28 having a portion thereof overlapping and adjustably secured to a plate member 29 projecting laterally from a pivot shaft 30 which is rotatably mounted in the frame by pivot screws 31 corresponding to the previously mentioned pivot screws 25, said pivot screws 31 being secured in adjusted position by set screws 32.

The adjustable connection between plates 28 and 29 comprises screws 33 which pass through elongated slots 33a in plate 28 and are threaded into openings 34 provided in plate 29, the heads of said screws being countersunk in recesses 35 formed on the upper surface of plate 28.

Figure 4:
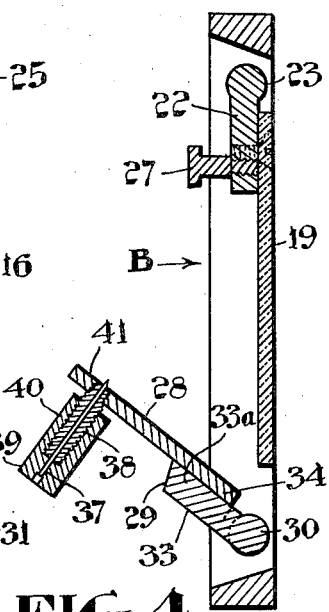
Figure 4 is a longitudinal sectional view along the line 4—4 of Figure 3.
Figure 3:
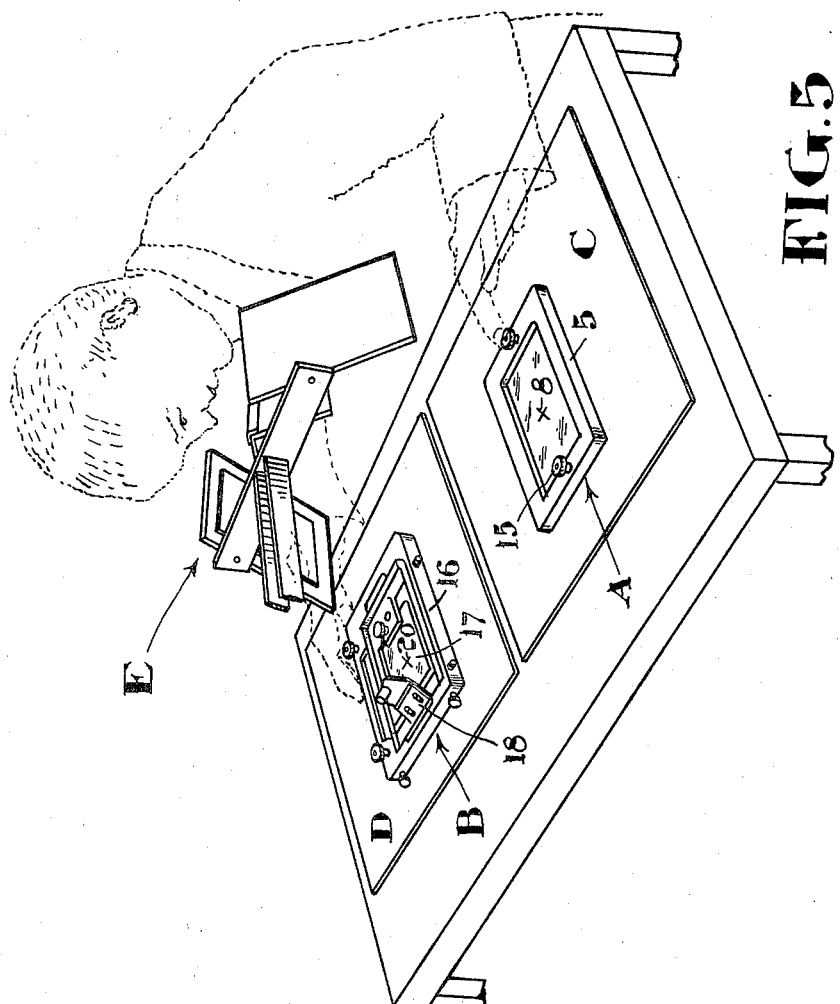

Plate 28 carries a sharp pointed tapered pin 37 mounted in a sectional holder comprising a post section 38 and a cap section 39. The pin is carried by cap section 39 and is tightly wedged in the tapered pin bore 40 of the post section 38 when the two sections of the holder are screwed together as shown in Fig. 4. The lower end of post section 38 is reduced and threaded into an opening 41 provided in plate 28. It will also be noted that the pointed end of pin 37 projects beyond the lower surface of plate 28.

Figure 3:
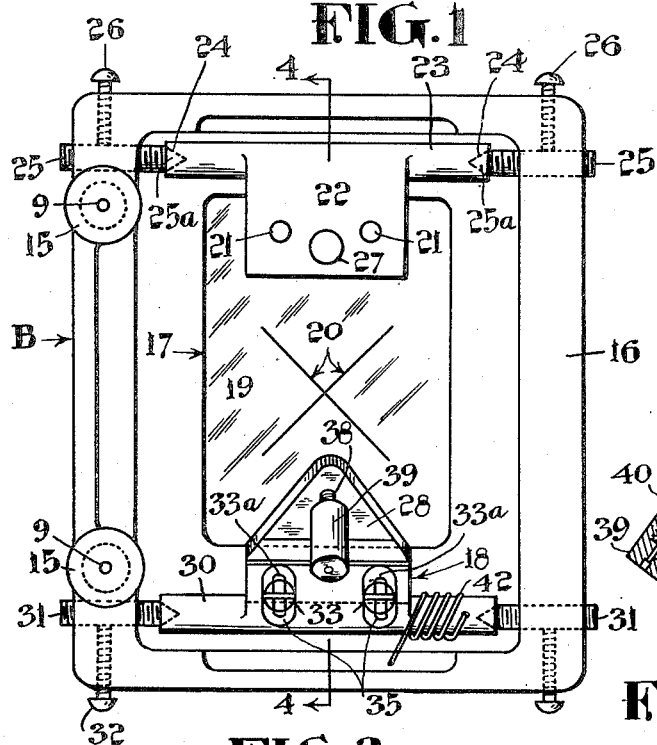
Figure 3 is a plan view of a second floating mark which is used in conjunction with that shown in Figure 1.

The marking element 18 is normally held in the raised position shown in Figs. 3 and 4 by a coiled biasing spring 42 surrounding shaft 30, one end of the spring being fixed to the shaft and the other end being engaged with frame 16 so that the spring is normally tensioned to hold element 18 in said raised position.

Figure 2:
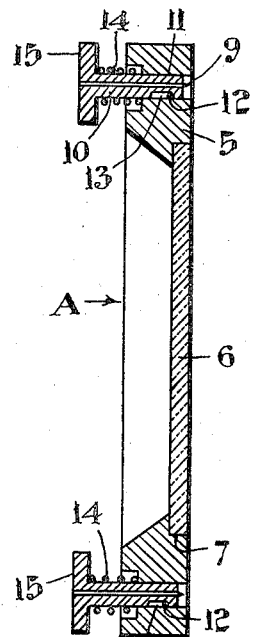
Figure 2 is a longitudinal sectional view along the line 2—2 of Figure 1.

The frame 16 of carrier B is provided with anchoring pins 9 corresponding to those previously described in connection with Figs. 1 and 2.

The cross 20 may be replaced by any other suitable form of floating mark. It is, however, desirable that the same type of floating mark be used on both of the transparent sheets 6 and 19.

In Fig. 5, I have shown two photographs, C and D, arranged in side by side relation beneath a stereoscope E through which the photographs and the floating marks 8 and 20 are viewed during the aforesaid operation of locating and marking the requisite reference or control points. In this instance frame 5 is shown placed on the face of photograph C and it is assumed that the intersection of the arms of cross 8 is centered on a control point which has been previously pin-pricked or otherwise marked on photograph D. Frame 16 is then placed on photograph D and shifted about until it appears to the operator that the two arms of cross 20 lie in a common plane and are grounded. This appearance of cross 20 occurs only when the intersection of the arms of the cross lies directly above the exact point on photograph D which corresponds to the point on photograph C on which the cross 8 is centered. The observer then raises the point locating element 17 of frame 16 so that pin 37 of point marking element 18 may be swung downwardly to pin-prick photograph D at the exact point formerly covered by the intersection of the arms of cross 20. During these point locating and marking operations the frames 5 and 16 are held against accidental movement by pressing down on the anchoring pins 9.

It is, of course, essential that marking pin 37 shall penetrate or mark the photograph at the exact point at which the intersection of the arms of the cross 20 was previously centered. This coincidence between the intersection of the cross 20 and the point of the marking pin 37 is obtained by appropriate adjustment of these parts through the agency of the pivots 25 and 31 and screws 33.

From the foregoing it will be seen that any point which is previously marked on one photograph and centered beneath the floating mark 8 of frame 5 may be readily located on the next overlapping photograph by shifting the frame 16 over the latter until the floating mark 20 is grounded with both of its arms lying in a common plane.

The foregoing description covers what I now consider to be a preferred embodiment of my invention. However, it will be understood that various modifications may be resorted to within the scope and spirit of the invention as defined by the appended claims.

Having thus described my invention, what I claim is:

1. A point locating and marking device for use in the construction of maps from aerial photographs by the radial line plotting method; comprising a frame having a central opening, a transparent sheet hinged to one side of said frame and provided with a floating mark capable of being accurately centered over a point of detail appearing on an aerial photograph on which the frame is placed during an observation and a marking element also pivoted to said frame so that said marking element may be used for marking on the photograph and extent point on which the floating mark was previously centered, the pivotal mounting of said sheet and marking element permitting them to be interchangeably swung to an operative position within the central opening of the frame.

2. A device for use in constructing maps from aerial photographs by the radial line plotting method comprising a frame having an opening therein, a transparent sheet hinged to one side of the frame and adapted to be swung to and from an operative position within said opening, said sheet being provided with a floating mark, a pin carrier also pivoted to said frame for swinging movement to and from an operative position within said opening and a marking pin secured to said carrier.

3. A point locating and marking device for use in the construction of maps from aerial photographs by the radial line plotting method; comprising a frame having a central opening, a transparent sheet movably connected to said frame and provided with a floating mark capable of being accurately centered over a point of detail appearing on an aerial photograph on which the frame is placed during an observation, a marking element also movably connected to said frame so that said marking element may be used for marking on the photograph the exact point on which said floating mark was previously centered, the connecting means of said sheet and marking element permitting them to be interchangeably moved to operative positions within the central opening of said frame.

4. A device for use in constructing maps from aerial photographs by the radial line plotting method; comprising a frame, having an opening therein, means mounting a floating mark on said frame for movement into and out of an operative position within said opening, means mounting a marking means carrier on said frame for movement into and out of an operative position within said opening when said mark is moved to an inoperative position, and marking means secured to said carrier.

5. The structure of claim 4, both of said mounting means being so co-related as to automatically position whichever of said mark or marking means that is in its operative position over the same point.

6. A device for use in constructing maps from aerial photographs by the radial line plotting method; comprising a mount, means mounting a floating mark on said mount for movement into and out of an operative position, and means mounting a marking means on said mount for movement into and out of an operative position immediately over the same point previously located by said mark after said mark has been moved to its inoperative position.

ALBERT E. SIMPSON.